United States Patent
Sheng

(10) Patent No.: US 8,358,448 B2
(45) Date of Patent: *Jan. 22, 2013

(54) SCANNING MEMBER WITH FLEXIBLE PRESSING MEMBER

(75) Inventor: Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 843 days.

This patent is subject to a terminal disclaimer.

(21) Appl. No.: 12/406,738

(22) Filed: Mar. 18, 2009

(65) Prior Publication Data

US 2009/0262401 A1    Oct. 22, 2009

(30) Foreign Application Priority Data

Apr. 21, 2008  (TW) .............................. 97114409 A

(51) Int. Cl.
*H04N 1/04* (2006.01)
(52) U.S. Cl. ........ 358/474; 358/498; 358/486; 358/497; 399/374; 399/367; 271/10.09; 271/3.14
(58) Field of Classification Search .................. 358/474, 358/498, 497, 486; 399/374, 367, 379; 271/10.09, 271/278, 4.01, 3.14, 3.18
See application file for complete search history.

(56) References Cited

U.S. PATENT DOCUMENTS

| | | | | |
|---|---|---|---|---|
| 2,830,563 A * | 4/1958 | Burckhalter | ................... | 91/169 |
| 6,167,232 A * | 12/2000 | Jimenez et al. | ................ | 399/367 |
| 6,563,611 B1 * | 5/2003 | Kao | ................... | 358/498 |
| 7,502,586 B2 * | 3/2009 | Shimizu | ........................ | 399/367 |
| 7,755,813 B2 * | 7/2010 | Nishikawa et al. | ............ | 358/497 |
| 8,064,106 B2 * | 11/2011 | Ishido | ............................ | 358/474 |
| 8,085,448 B2 * | 12/2011 | Kato et al. | ..................... | 358/474 |
| 2008/0055676 A1 * | 3/2008 | Sugeta et al. | ................. | 358/498 |

FOREIGN PATENT DOCUMENTS

| | | |
|---|---|---|
| CN | 256925 Y | 8/2003 |
| CN | 101064764 A | 10/2007 |
| JP | 2004336274 | 11/2004 |

* cited by examiner

*Primary Examiner* — Negussie Worku

(57) ABSTRACT

A scanning device includes a transparent platen, a scanning module, a document transporting mechanism and a flexible pressing member. The scanning module is located in a scan zone and acquires through the transparent platen an image of a document. The document transporting mechanism transports the document along a passageway and across the scan zone. The flexible pressing member is disposed in the passageway, upstream of the scan zone or within the scan zone and located apart from the transparent platen by a gap. The flexible pressing member is deformed in a direction away from the transparent platen due to a force applied by the document transported across the scan zone.

20 Claims, 9 Drawing Sheets

SCANNING MEMBER WITH FLEXIBLE PRESSING MEMBER

This application claims priority of No. 097114409 filed in Taiwan R.O.C. on Apr. 21, 2008 under 35 USC 119, the entire content of which is hereby incorporated by reference.

BACKGROUND OF THE INVENTION

1. Field of Invention

The invention relates to a scanning device, and more particularly to a scanning device having a flexible pressing member for pressing documents having different thicknesses. The flexible pressing member may be deformed and is arranged such that it is located apart from a transparent platen of the scanning device by a gap.

2. Related Art

In a conventional automatic document feeder, rollers are usually adopted to transport a document onto a scan platen so that a scanning module disposed below the scan platen can capture an image of the document. The depth of field for the image sensor employed in the scanning module is critical to the scan quality of the images generated. Greater the depth of field the image sensor has, the greater tolerance for the distance between the document and the sensor is allowed. Particularly, for the scanner using a contact image sensor (CIS), the image sensor has to be placed extremely close to the paper being scanned in order to obtain a sharp image of the document.

Conventionally, a roller is utilized in a scanner to limit the document transported past the scan window to fall within the range of the depth of field of the scanning module effectively. The roller is in sliding contact with the scan platen. When the document is being transported past the scan window, the roller is in rolling contact with the document, and the document is pressed against the scan platen. In this case, the roller and the scan platen tend to wear off because of the frictional contact there between, which consequently deteriorates the scan quality of the resulting images. In addition, when a thicker sheet of the document is being scanned, the document may not enter the gap between the roller and the scan window for the gap width being smaller than the thickness of the sheet, such that a paper jam may occur and interrupt the scan procedure. Thus, in the prior art, a motion-limiting mechanism is added to the roller for supporting the roller and provides the roller with a track to move up and down. Hence, the gap between the roller and the scan window may be adjusted according to the thickness of the document, and the document may be transported through the gap. However, this mechanism requires more components and the longer assembling time, and the manufacturing cost is inevitably increased.

SUMMARY OF THE INVENTION

It is therefore an object of the invention to provide a scanning device having a flexible pressing member, disposed upstream of a scan zone or within the scan zone, for pressing a document and for effectively adjusting the distance between the document and the transparent platen. Thus, the documents of different thicknesses can be pressed and transported along the transparent platen more adaptively.

To achieve the above-identified object, the invention provides a scanning device including a transparent platen, a scanning module, a document transporting mechanism and a flexible pressing member. The scanning module, located in a scan zone, acquires through the transparent platen an image of a document. The document transporting mechanism transports the document along a passageway and across the scan zone. The flexible pressing member is disposed in the passageway, and disposed upstream of the scan zone or within the scan zone. The flexible pressing member is located apart from the transparent platen by a gap. The flexible pressing member is deformed in a direction away from the transparent platen due to a force applied by the document transported across the scan zone.

According to the scanning device of the invention, the flexible pressing member, disposed upstream of the scan zone or within the scan zone, is provided to press the document, and the flexible pressing member located apart from the transparent platen by the gap is configured to be deformable. Thus, the flexible pressing member can adaptively press the documents of different thicknesses and the documents can slide past the scan zone.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
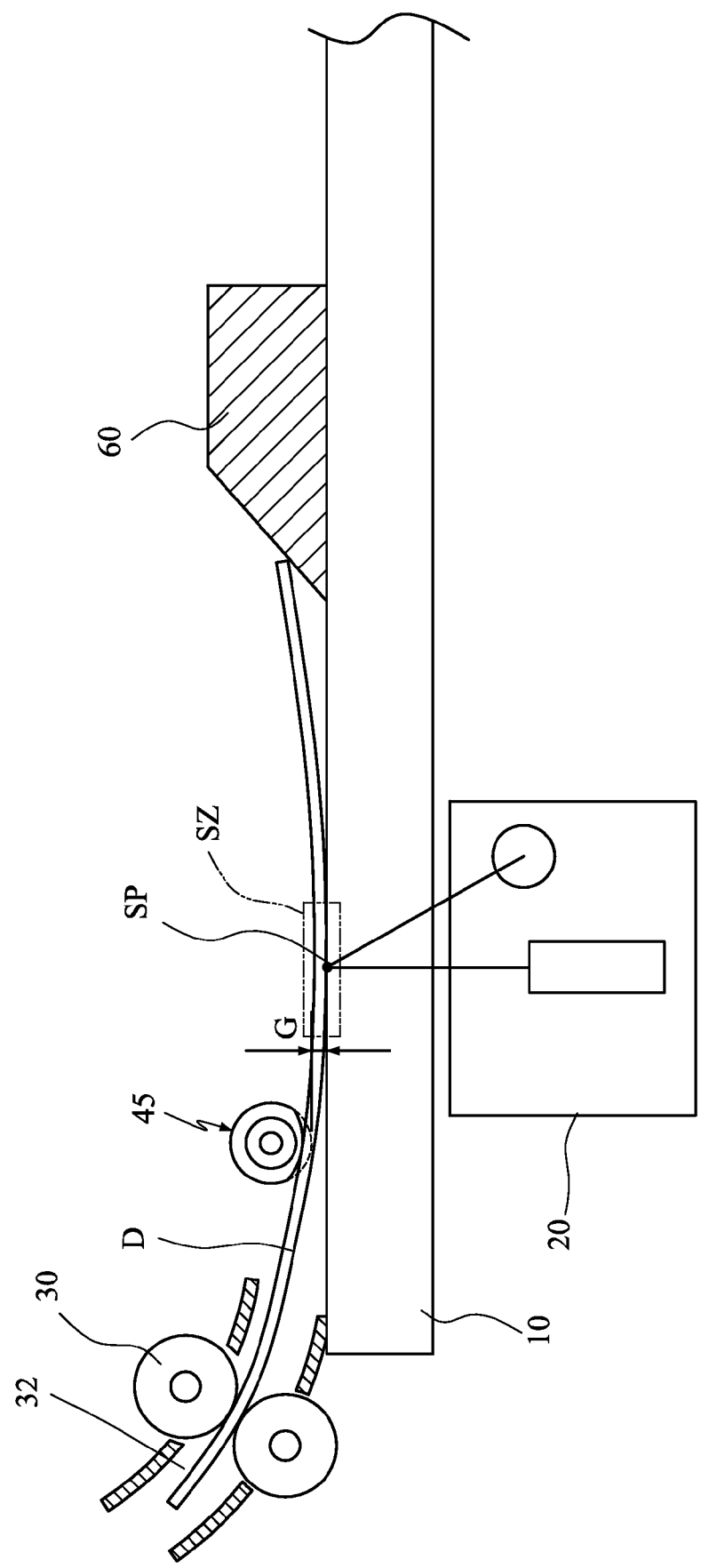
FIGS. 1 and 2 are schematic illustrations showing two states of a scanning device according to a first embodiment of the invention.
Figure 2:
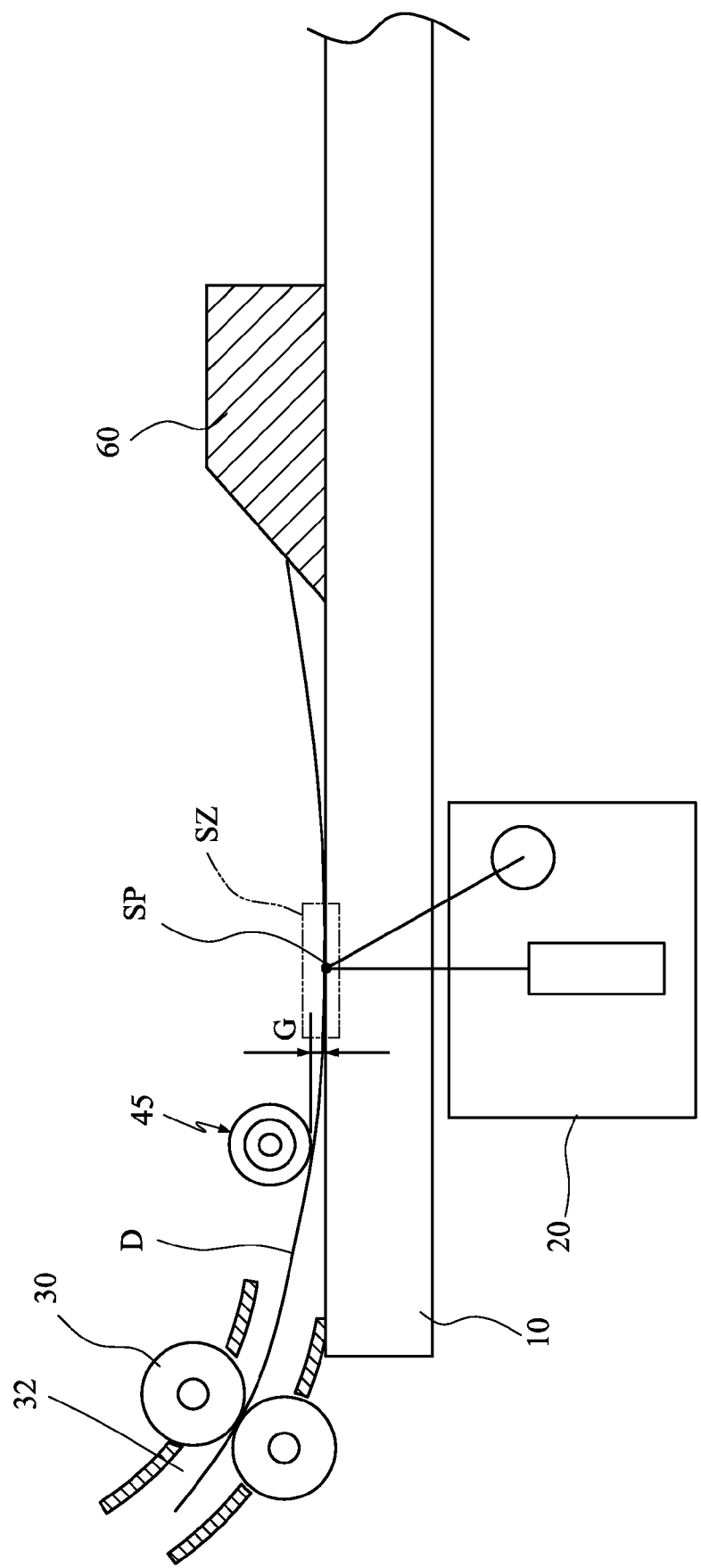

FIGS. 1 and 2 are schematic illustrations showing two states of a scanning device according to a first embodiment of the invention. Referring to FIG. 1, the scanning device of this embodiment includes a transparent platen 10, a scanning module 20, a document transporting mechanism 30 and a flexible pressing member 45.

The scanning module 20 located in a scan zone SZ acquires through the transparent platen 10 an image of a document D. The document transporting mechanism 30 transports the document D along a passageway 32 and across the scan zone SZ, in which the scanning module 20 acquires the image of the transported document D.

The flexible pressing member 45, disposed in the passageway 32 and located upstream of the scan zone SZ (see FIG. 1) or within the scan zone SZ (see FIG. 11), presses the transported document D as the transported document D enters the scan zone SZ. The upstream side is defined based on the direction of transporting the document D. Thus, the document D is firstly transported past the flexible pressing member 45 and then the scan zone SZ. The flexible pressing member 45 is disposed over and spaced from the transparent platen 10 by a gap G. The flexible pressing member 45 is deformed in a direction away from the transparent platen 10 by a force applied by the transported document D.

In this embodiment, the flexible pressing member 45 is a roller, which is preferably a hollow rubber wheel. An outer periphery of the rubber wheel is deformed in the direction away from the transparent platen 10 when being pushed by the document D (the original shape of the lower portion of the roller is depicted by the dashed line). The roller may be driven by a driving device, such as a motor; or, the roller may be an idle roller and only be pushed by the document. Alternatively, the roller may be a fixed element. In this case, the flexible pressing member 45 could be an elastic sheet and a distance between the elastic sheet and the transparent platen is equal to the gap G.

As shown in FIG. 2, the flexible pressing member 45 is disposed upstream of the scan zone SZ and is not in close contact with the transparent platen 10. When a relatively thin sheet of document D is being scanned, the flexible pressing member 45 presses the document D without being deformed in any way. If the flexible pressing member is in close contact with the transparent platen 10, the document D may curve upwards in the scan zone SZ, which may result in scan image deterioration. In addition, in order to smoothly output the document, the scanning device further includes a guiding element 60 for guiding the document D out of the passageway 32.

Figure 3:
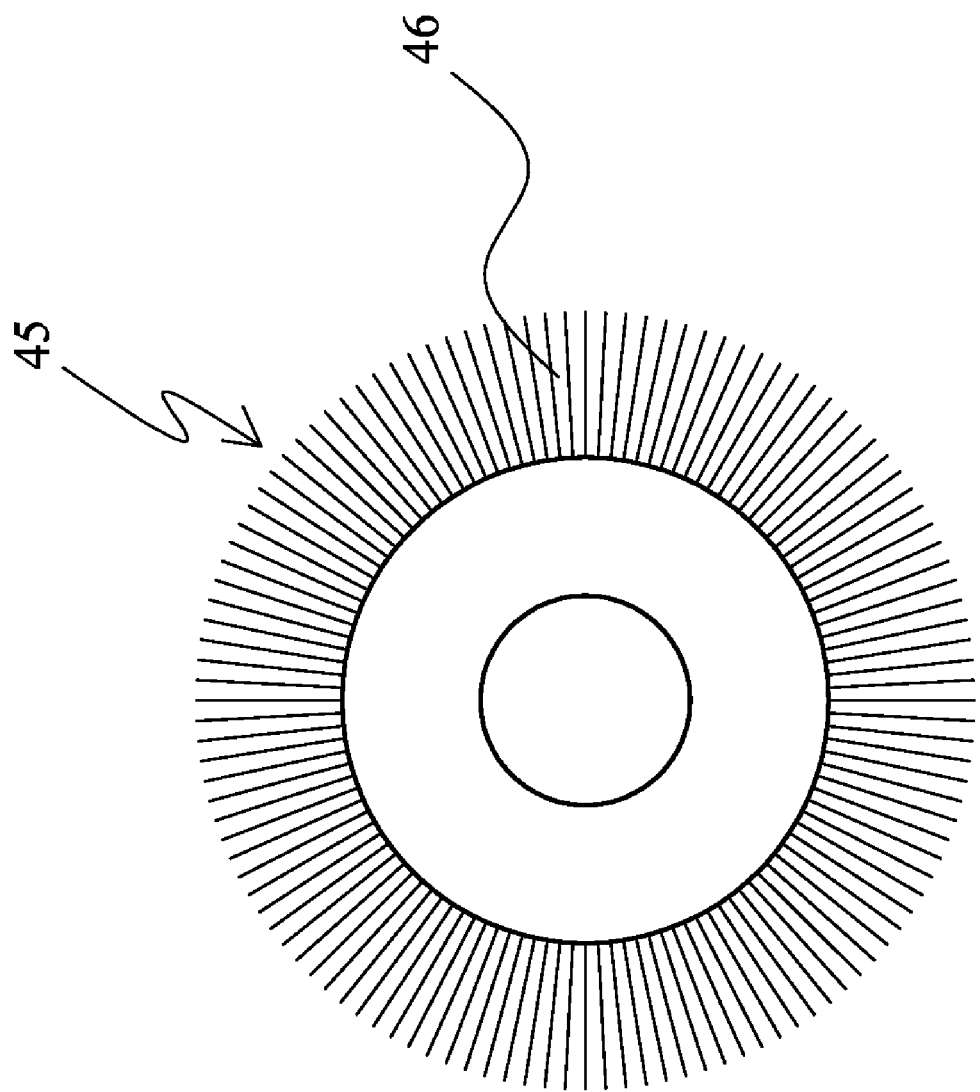
FIG. 3 is a schematic illustration showing another aspect of a flexible pressing member.

FIG. 3 is a schematic illustration showing another aspect of a flexible pressing member. In this embodiment, the roller of the flexible pressing member 45 has an annular brush 46 formed on the periphery of the roller, which has a plurality of bristles and may be deformed when being pushed by the document D transported through the gap between the transparent platen 10 and the flexible pressing member 45. The bristles are bent in a direction away from the transparent platen 10 as pressing against the document D. The annular brush 46, other than for pressing the document D, can be used to clean the document D. Alternatively, the flexible pressing member 45 may have a brush in any form, which has a plurality of bristles that may be bent in the direction away from the transparent platen 10 when being pushed by the document D.

In this embodiment, the scanning module 20 usually scans the document D at a scan position SP of the scan zone.

Figure 4:
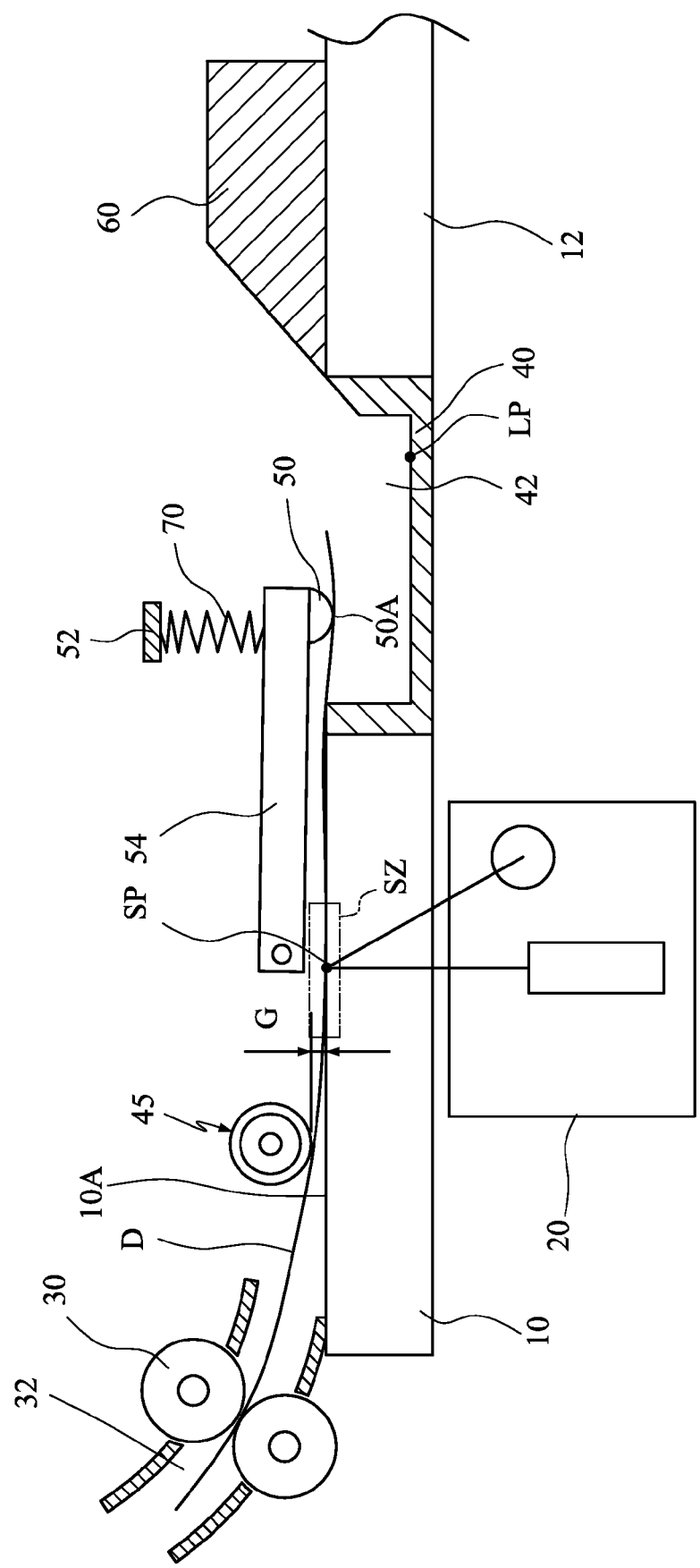
FIG. 4 is a schematic illustration showing a scanning device according to a second embodiment of the invention.
Figure 5:
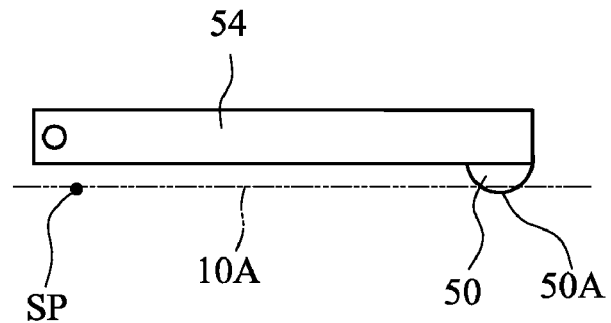
FIGS. 5 to 7 show several examples of the pressing elements of the invention.

FIG. 4 is a schematic illustration showing a scanning device according to a second embodiment of the invention. FIG. 5 is a schematic illustration showing the downstream pressing member corresponding to FIG. 4. As shown in FIGS. 4 and 5, the scanning device of this embodiment is similar to the first embodiment except that the scanning device of this embodiment further includes a downstream sector 40 and a first downstream pressing member 50.

The downstream sector 40 is located downstream of the scan zone SZ, and has an upper surface LP positioned lower than an upper surface 10A of the transparent platen 10. The downstream side is defined based on the direction in which the document D is transported. The document D is firstly moved across the scan zone SZ and then the downstream sector 40. The downstream pressing member 50 facing the downstream sector 40 limits the distance between the document D and the transparent platen 10. The downstream pressing member 50 may have a projection. In this embodiment, the downstream pressing member 50 is fixed onto a rocker arm 54 capable of rocking with respect to a housing 52. In addition, the scanning device of this embodiment further includes a spring 70 for applying a force to the downstream pressing member 50 through the rocker arm 54 to bias the downstream pressing member 50 toward the downstream sector 40. Alternatively, the spring 70 may be omitted so that the downstream pressing member 50 is biased toward the downstream sector 40 by its self weight or its self elasticity. Alternatively, a magnetic force may be applied to the downstream pressing member 50 so that the downstream pressing member 50 is biased toward the downstream sector 40.

In this embodiment, the downstream sector 40 has a cavity 42, and the downstream pressing member 50 is spaced from the upper surface LP of the downstream sector 40 by a downstream gap. Alternatively, the downstream sector 40 may also include an inclined surface as long as the upper surface LP of the downstream sector 40 is lower than the upper surface 10A of the transparent platen 10.

In this embodiment, the downstream sector 40 is located adjacent to the transparent platen 10. In order to smoothly output the document D, the scanning device further includes the guiding element 60, disposed downstream of the downstream sector 40 and adjacent to the downstream sector 40, for guiding the document D out of the passageway.

The transparent platen 10 is usually a glass sheet and is connected with another glass sheet 12 by the downstream sector (as a connecting element) 40. The transparent platen 10 is used for the automatic document scan operations, while the glass sheet 12 is used for the flatbed scan operations. It is to be noted that the scanning device of the invention may be a sheet-fed scanner or a combination of a flatbed scanner and an automatic document feeder. The guiding element 60 disposed above the glass sheet 12 or between the transparent platen 10 and the glass sheet 12 guides the document D to move in a direction toward a discharge tray (not shown). The cavity 42 of the downstream sector 40 provides a space for the downstream pressing member 50 to move therein. Such, in the normal state, a contact portion 50A of the downstream pressing member 50, which contacts with the document D, may be lower than the upper surface 10A of the transparent platen 10. Thus, the document D, which is being transported past the scan zone SZ, may slide on the upper surface 10A of the transparent platen 10.

Figure 6:
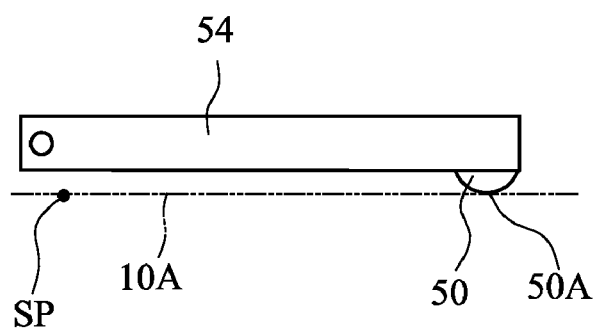

FIG. 6 shows another example of the downstream pressing element of the invention. For the sake of illustration, a phantom line is depicted as the extension of the upper surface 10A of the transparent platen 10. In this example, the contact portion 50A of the first downstream pressing member 50, which contacts with the document D, is flush with the upper surface 10A of the transparent platen 10 in the scan zone SZ.

Figure 7:
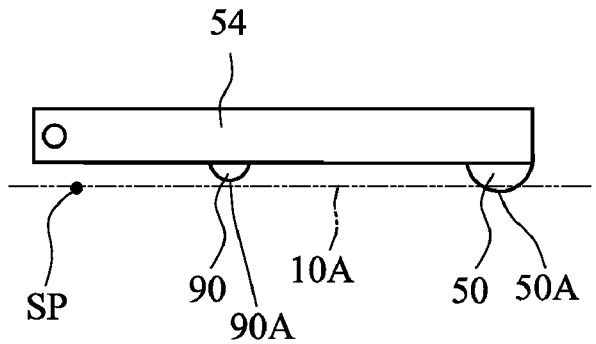

FIG. 7 shows still another example of the downstream pressing element of the invention. Referring to FIG. 7, the scanning device of the invention further includes a second downstream pressing member 90, which is fixed onto the rocker arm 54 and disposed opposite the transparent platen 10 and downstream of the scan zone SZ. The second downstream pressing member 90 and the first downstream pressing member 50 are disposed on the rear side of the scan zone SZ. The second downstream pressing member 90 may also be disposed on the front side of the scan zone SZ. A lowest point 90A of the second downstream pressing member 90 is higher than the upper surface 10A of the transparent platen 10 in the scan zone SZ. A gap is thus formed between the second downstream pressing member 90 and the transparent platen 10 for allowing the document D to pass.

It is to be noted that the first downstream pressing member 50 or the second downstream pressing member 90 may have a camber for pressing against the document D. Alternatively, the document D and either one of the downstream pressing members may be kept in contact at one single point.

It is to be noted that the downstream pressing member may also be replaced with a roller. Because the structure is simple and can be derived according to the following embodiments, detailed descriptions thereof will be omitted.

Figure 8:
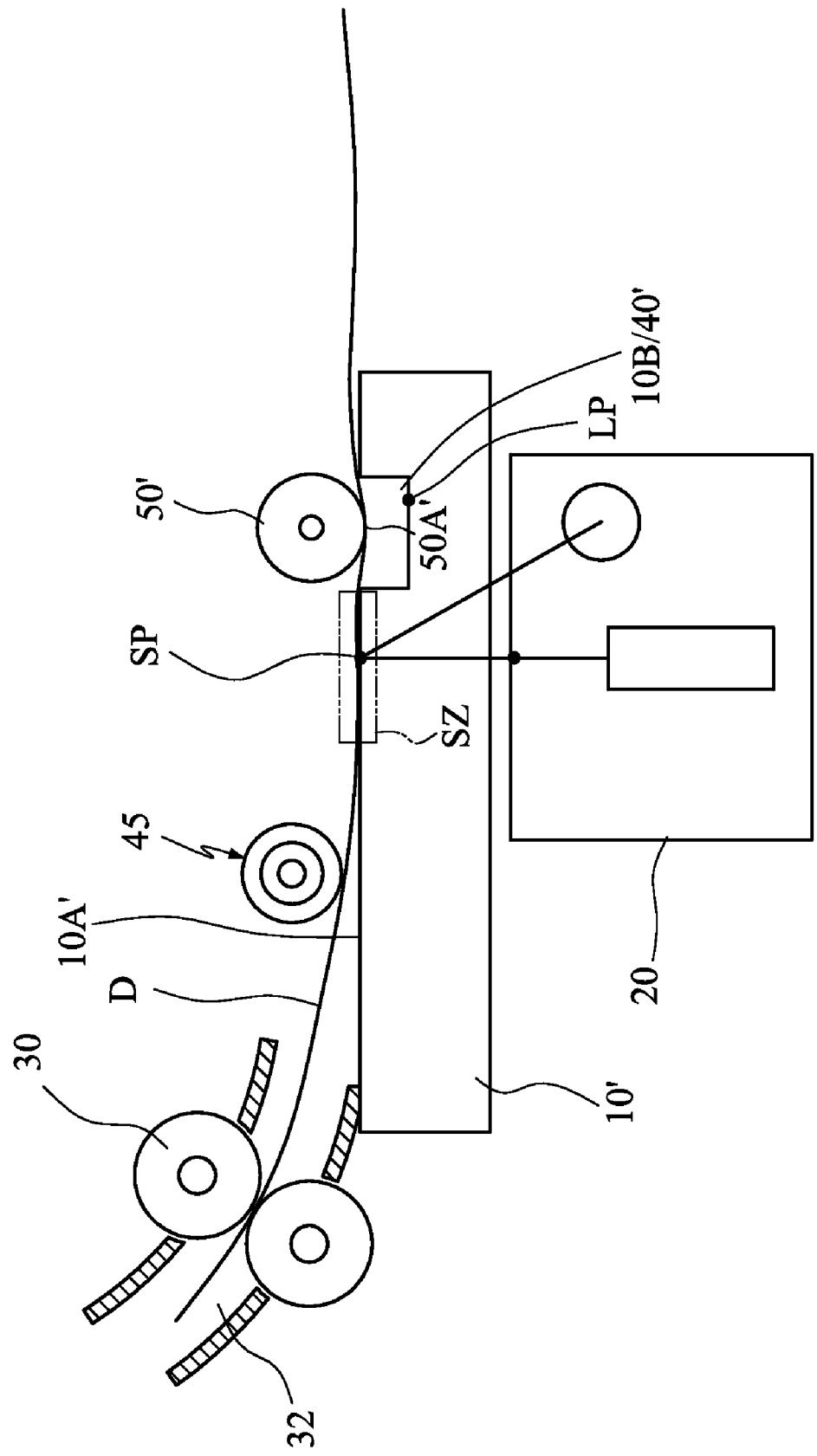
FIG. 8 is a schematic illustration showing a scanning device according to a third embodiment of the invention.

FIG. 8 is a schematic illustration showing a scanning device according to a third embodiment of the invention. As shown in FIG. 8, the scanning device of this embodiment is similar to that of the second embodiment except that the scanning device of this embodiment is a sheet-fed scanner, and a downstream pressing member 50' is a roller. A low point 50A' of the roller 50' is disposed in a cavity 10B of a transparent platen 10'. Herein, the cavity 10B may be included as part of a downstream sector 40'. An upper surface LP of the downstream sector 40' is still lower than an upper surface 10A' of the transparent platen 10'.

Figure 9:
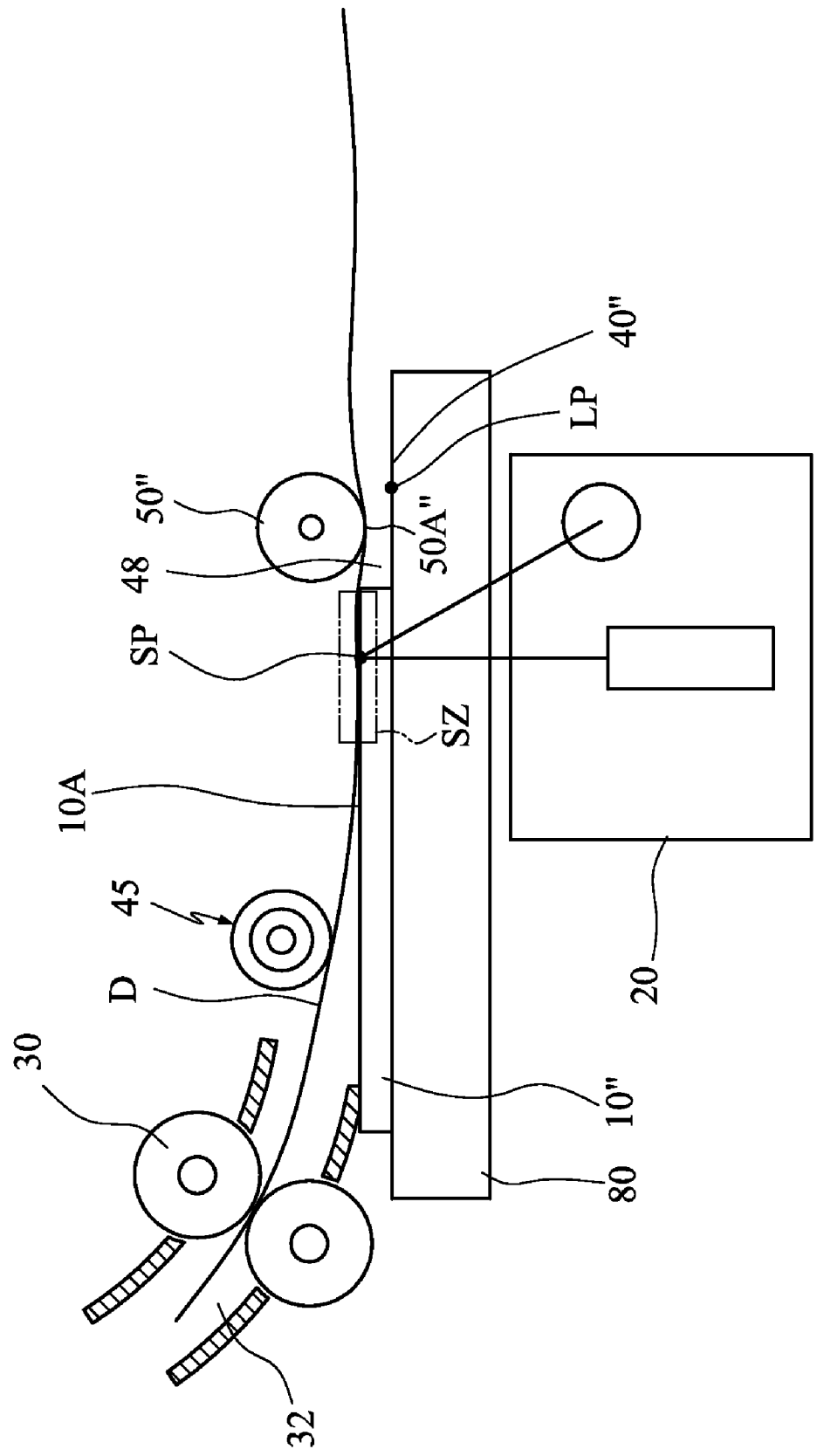
FIG. 9 is a schematic illustration showing a scanning device according to a fourth embodiment of the invention.

FIG. 9 is a schematic illustration showing a scanning device according to a fourth embodiment of the invention. As shown in FIG. 9, this embodiment is similar to the second embodiment except that the scanning device of this embodiment further includes a lower platen 80 disposed below a transparent platen 10". A step 48 between the lower platen 80 and the transparent platen 10" is formed in a downstream sector 40", and a low point 50A" of a downstream pressing member 50" is located in the step 48.

Figure 10:
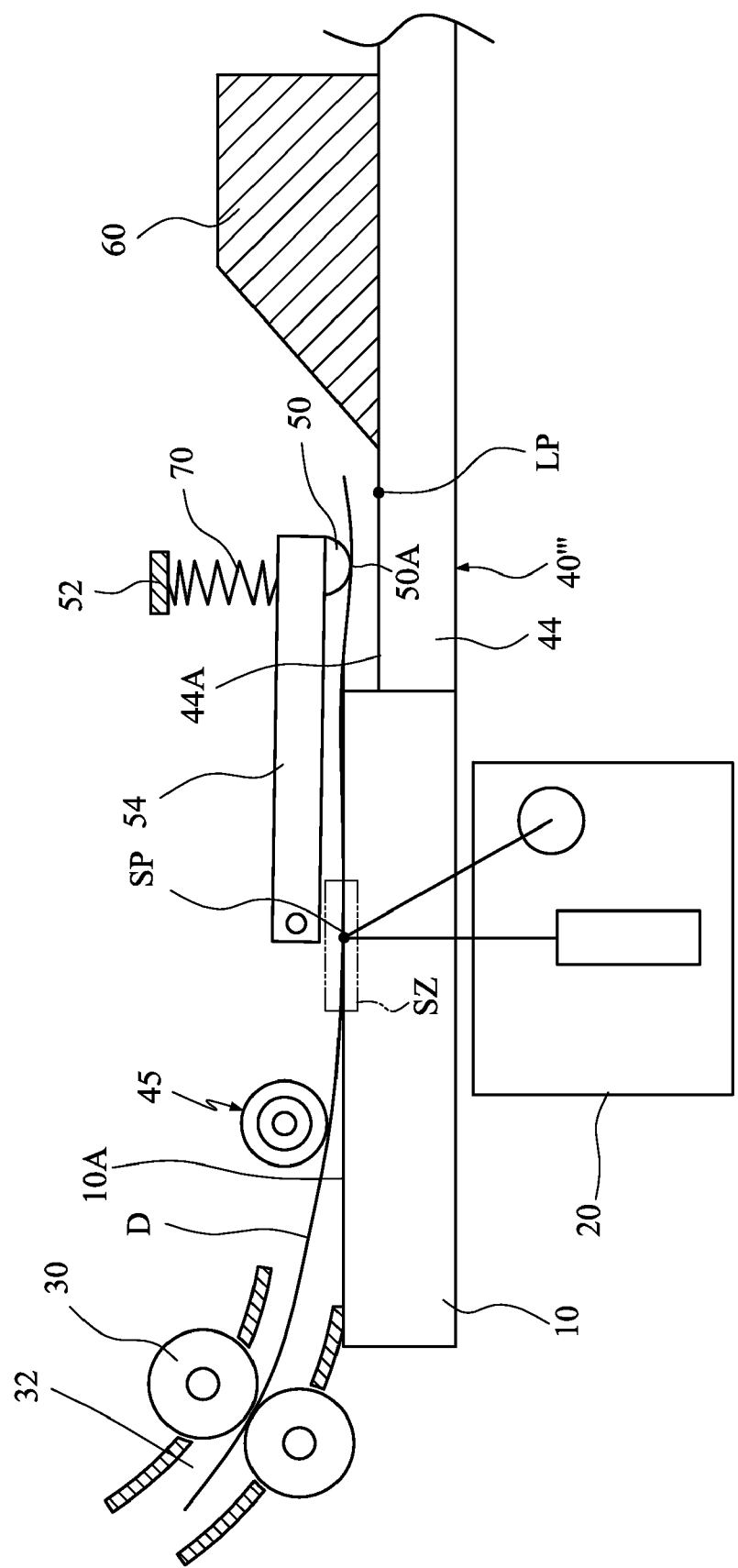
FIG. 10 is a schematic illustration showing a scanning device according to a fifth embodiment of the invention.

FIG. 10 is a schematic illustration showing a scanning device according to a fifth embodiment of the invention. As shown in FIG. 10, this embodiment is similar to the second embodiment except that a downstream sector 40'" of the scanning device of this embodiment includes a platen 44, which is disposed adjacent to the transparent platen 10 and has an upper surface 44A lower than the upper surface 10A of the transparent platen 10. The downstream pressing member 50 faces the platen 44. The thickness of the platen 44 is smaller than that of the transparent platen 10.

Figure 11:
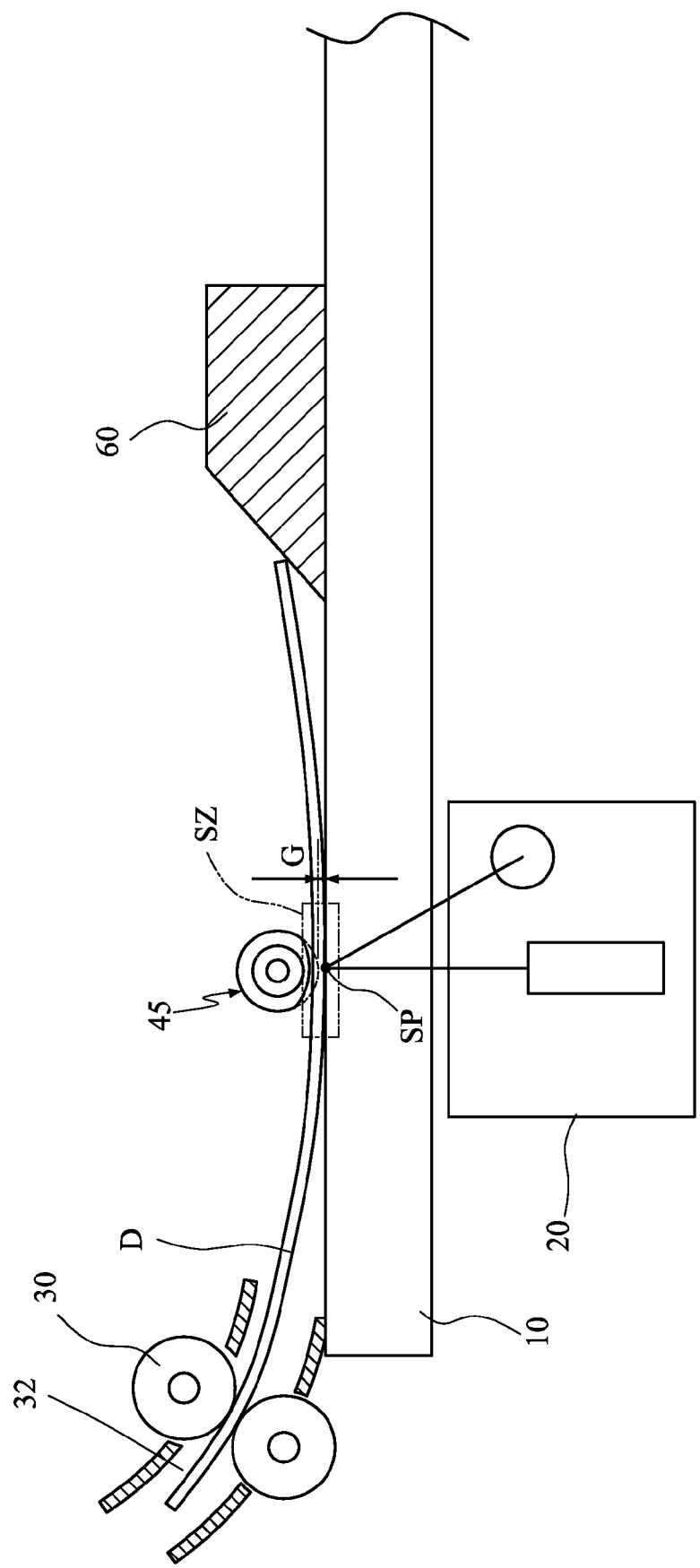
FIG. 11 is a schematic illustration showing a scanning device according to a sixth embodiment of the invention.

FIG. 11 is a schematic illustration showing a scanning device according to a sixth embodiment of the invention. As shown in FIG. 11, the flexible pressing member 45 is disposed in the passageway 32 and in the scan zone SZ.

According to the embodiments of the invention, the flexible pressing member, disposed upstream of the scan zone or within the scan zone, may be provided to press the document, and the flexible pressing member separated from the transparent platen by a gap is configured to be deformable. Thus, the flexible pressing member can adaptively press the documents of different thicknesses against the transparent platen in the scan zone. On the other hand, the invention also adopts the downstream pressing member disposed on the downstream side to press the document so that the friction between the pressing element and the transparent platen can be reduced, and the distance between the document and the transparent platen can be effectively controlled.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A scanning device, comprising:
   a transparent platen;
   a scanning module, located in a scan zone, for acquiring through the transparent platen an image of a document;
   a document transporting mechanism for transporting the document along a passageway and across the scan zone, in which the scanning module acquires the image of the transported document; and
   a flexible pressing member, disposed in the passageway and located upstream of the scan zone or within the scan zone, for pressing the transported document as the transported document enters the scan zone, wherein the flexible pressing member is disposed over the transparent platen and spaced from the transparent platen by a gap, and the flexible pressing member is deformed in a direction away from the transparent platen by a force applied by the transported document.

2. The scanning device according to claim 1, wherein the flexible pressing member is a roller.

3. The scanning device according to claim 2, wherein the roller is a hollow rubber wheel, wherein an outer periphery of the hollow rubber wheel is deformed in the direction away from the transparent platen when being pushed by the document.

4. The scanning device according to claim 2, wherein the roller has an annular brush, wherein the annular brush is deformed in the direction away from the transparent platen when being pushed by the document.

5. The scanning device according to claim 1, wherein the flexible pressing member has a brush, wherein the brush is deformed in the direction away from the transparent platen when being pushed by the document.

6. The scanning device according to claim 1, further comprising:
   a downstream sector, disposed downstream of the scan zone, wherein an upper surface of the downstream sector is positioned lower than an upper surface of the transparent platen; and
   a downstream pressing member, disposed opposite the downstream sector, for limiting a distance between the document and the transparent platen.

7. The scanning device according to claim 6, wherein the downstream sector is disposed adjacent to the transparent platen.

8. The scanning device according to claim 6, further comprising a guiding member, disposed downstream of the downstream sector and adjacent to the downstream sector, for guiding the document out of the passageway.

9. The scanning device according to claim 6, wherein the downstream pressing member is spaced from the upper surface of the downstream sector by a downstream gap.

10. The scanning device according to claim 6, wherein the downstream pressing member has a projection.

11. The scanning device according to claim 6, wherein the downstream pressing member is a roller.

12. The scanning device according to claim 6, further comprising a spring for biasing the downstream pressing member toward the downstream sector.

13. The scanning device according to claim 6, wherein the downstream pressing member is biased toward the downstream sector by a self weight or self elasticity of the downstream pressing member.

14. The scanning device according to claim 6, wherein a magnetic force is applied to the downstream pressing member to bias the downstream pressing member toward the downstream sector.

15. The scanning device according to claim 6, wherein the downstream sector comprises a cavity.

16. The scanning device according to claim 6, wherein the downstream sector comprises an inclined surface.

17. The scanning device according to claim 6, further comprising a lower platen disposed below the transparent platen, wherein a step between the lower platen and the transparent platen forms the downstream sector.

18. The scanning device according to claim 6, wherein the downstream sector comprises a platen disposed adjacent to the transparent platen, and an upper surface of the platen is lower than the upper surface of the transparent platen.

19. The scanning device according to claim 6, further comprising a second downstream pressing member disposed opposite the transparent platen and downstream of the scan zone.

20. The scanning device according to claim 19, wherein the second downstream pressing member is spaced from the transparent platen by a downstream gap.

* * * * *